July 28, 1931. J. COLOMBO 1,816,005
VEHICLE FENDER AND BRAKE
Filed Jan. 29, 1931
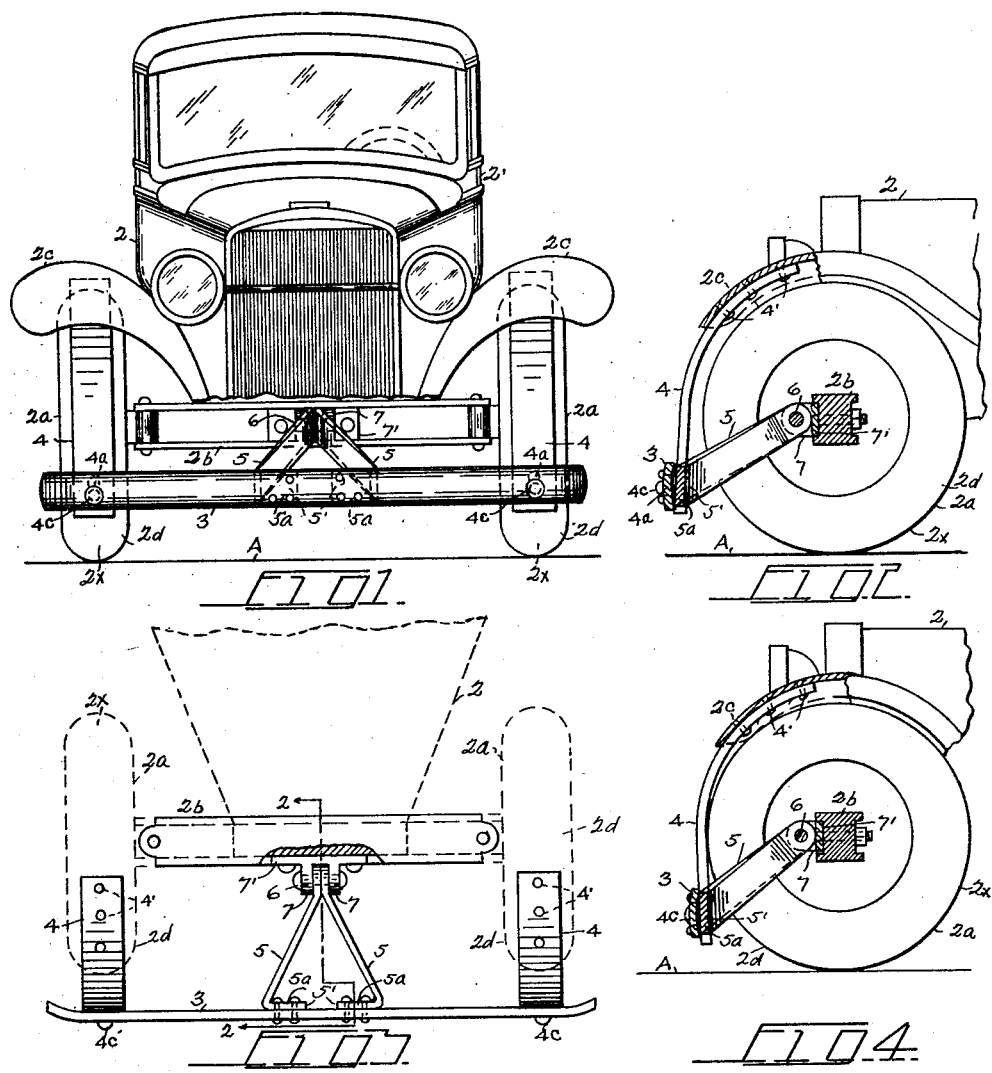
INVENTOR.
John Colombo.
BY Harry D. Wallace.
ATTORNEY.

Patented July 28, 1931

1,816,005

UNITED STATES PATENT OFFICE

JOHN COLOMBO, OF AUBURN, NEW YORK, ASSIGNOR OF THREE-FOURTHS TO GIUSEPPI SICILIANO, SAMUEL PIRO, AND FRANK LO BRANCKO, OF YORK, PENNSYLVANIA

VEHICLE FENDER AND BRAKE

Application filed January 29, 1931. Serial No. 512,023.

This invention relates to a combined fender and brake, designed for use in connection with automobiles, and the like, and has for its object to provide a low-swung fender to be mounted transversely across the front of the vehicle so as to overlap the two forward wheels, the ends of said fender being supported by the corresponding mudguards, and the medial portion of the fender being braced and stiffened by means directly connected with the forward axle of the vehicle. A further object is to provide a low-swung fender of this class which is arranged to fend off or brush to one side or the other from the path of the vehicle grown-up persons, children or other living things that happen to be knocked down by the vehicle, in order to prevent or at least to greatly minimize the danger of crushing and further injuring the sprawling bodies or limbs by the latter being run over by the wheels. A further object is to so mount the present fender that in case of collision with relatively heavy objects, the force of the initial impact tends to flex the end supports of the fender and cause them to frictionally engage, like brakeshoes, the treads of the tires of the front wheels for stopping or materially slowing down the vehicle before serious damage or injury is inflicted.

The various features and parts of the invention will be understood from the detailed description which follows, and by reference to the accompanying drawings, in which—

Figure 1 is a front elevation of an automobile to which my low-swung fender is applied. Fig. 2 is a broken side elevation and partial central vertical longitudinal section, the latter being taken substantially on line 2—2 of Fig. 3, showing one of the medial braces in relation to the fender and the axle of the vehicle. Fig. 3 is a broken-plan view in shadow of the automobile and a full line plan of the fender and related parts. And Fig. 4 is a view similar to Fig. 2, showing the fender hangers and the ends of the mudguards flexed for engaging and braking the front wheels and stopping or retarding the vehicle.

In the drawings, 2 represents an automobile having a body 2', front wheels 2a, front axle 2b, and forward mudguards 2c.

3 represents my fender comprising a bar of steel or other suitable metal which is preferably longer than the gauge of the wheels 2a and disposed horizontally and overlapping said wheels. The fender 3 is virtually suspended from the mudguards 2c by arc-shaped preferably substantially flat metal hangers or members 4, whose top ends are shown riveted or bolted, as at 4', to the under sides of the mudguards 2c, and the hangers 4 preferably coincide with and partially overlie the treads 2x of the wheels 2a. The lower ends of the hangers 4 are preferably slotted, as at 4a, to receive bolts 4c which also pass through perforations near the opposite ends of the fender 3. This enables the fender to be adjusted towards and away from the roadway as A. The fender is preferably supported and reinforced medially by angular relatively stiff spring metal braces 5, whose rear ends are pivoted by a pin 6 between forwardly projecting perforated lugs 7, of a bracket 7', the latter being bolted to the axle 2b. Hinging the braces 5, as shown in the drawings, enables the fender to be raised and lowered within a short range without requiring any particular readjustment of the supporting parts and without cramping the fender to an injurious extent. The mudguards 2c are usually more or less flexible, and when the hangers 4 are properly formed, the guards normally space the fender from the tires, as 2d, as shown in Fig. 3, and in case the fender encounters a heavy or stout resisting body, this flexibility allows the members 4 to yield or move rearwardly against the tires 2d, as shown in Fig. 4, to brake the wheels 2a and either stop or slow down the speed of the vehicle, thereby lessening the danger of further injuring persons or objects with which the vehicle may collide. The forward ends 5' of the braces 5, are preferably spread apart and are also bent toward each other, as at 5a, parallel to the fender, and these bent portions may be riveted or otherwise rigidly secured to the fender 3, as shown. The fender is preferably low-swung and normally spaced three or four inches from the surface of the roadway or pavement, so as to fend off relatively small bodies such as the arms and legs of persons, fowls, dogs, or other movable obstructions and prevent them from being run over by the wheels 2a.

Having thus described my invention, what I claim, is—

1. A low-swung fender for automobiles comprising a horizontal bar having a length greater than the gauge of the front wheels, flexible hangers carried by the mudguards of the automobile to normally support the ends of the said bar in spaced relation to the treads of the wheels adapted when said bar encounters objects in the path of the automobile to frictionally engage the treads of the wheels by the force of the impact, and hinged braces to reinforce the medial portion of said bar.

2. A low-swung fender for vehicles comprising a horizontal bar disposed across and overlapping the front wheels of a vehicle, arc-shaped hangers secured to and depending from the forward ends of the mudguards to support the opposite ends of said bar, said hangers coinciding with the treads of the corresponding tires, adapted when the bar encounters obstructions on the roadway, to frictionally engage the treads and slow down the speed of the vehicle, and braces supported by the forward axle of the vehicle and secured to the medial portion of said bar to partially absorb the shocks when the bar collides with various objects.

3. A fender for preventing human or other bodies from being run over and injured by automobiles, and like vehicles, comprising a bar extended horizontally across the front wheels of the vehicle and overlapping the treads of said wheels, means depending from the mudguards to support the opposite ends of said bar, said mudguards adapted to flex under the impact of the bar striking a body to cause said supporting means to frictionally engage the treads to retard and stop the vehicle, and hinged braces secured to the medial portion of the fender to absorb the shocks when the fender strikes various objects.

4. A fender and braking mechanism adapted for mounting upon the front end of an automobile, or other vehicle, comprising a horizontally disposed bar low-swung to within a few inches of the plane of the roadway and overlapping the front wheels, hangers secured to the front ends of the mudguards and extending downwardly and adjustably secured to the ends of said bar, said hangers coinciding with the treads of the tires of the wheels and adapted to be flexed, together with the ends of the mudguards, to engage the tread and stop or retard the vehicle whenever the fender encounters resistance of a person's body or other obstruction, and means secured to the forward axle of the vehicle and also to the medial portion of said bar to brace the bar.

In testimony whereof I affix my signature.

JOHN COLOMBO.